Oct. 1, 1963
C. H. THOMPSON
3,105,722
SILO DISTRIBUTOR
Filed Feb. 27, 1961
2 Sheets-Sheet 1
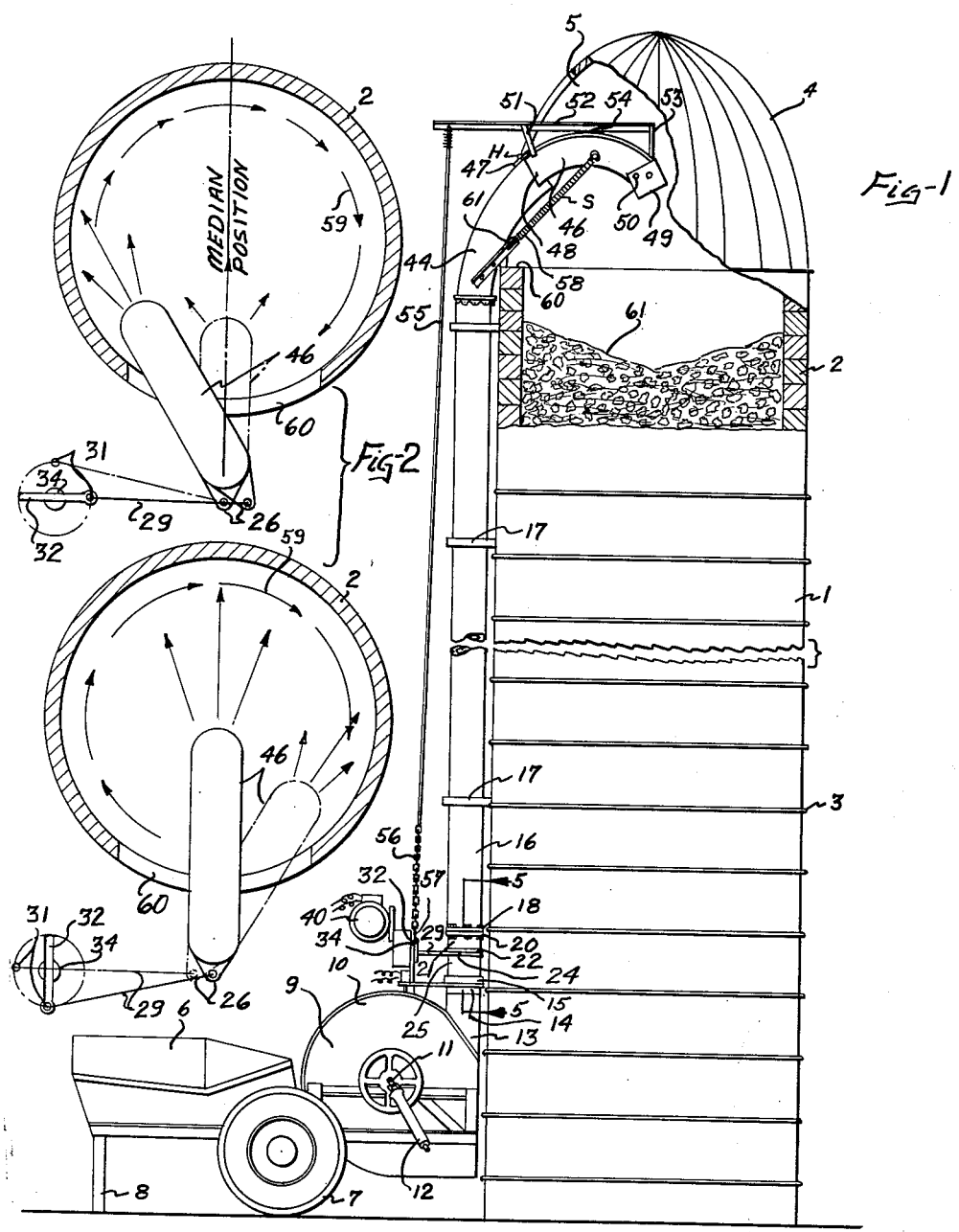
INVENTOR.
CLAY HUDSON THOMPSON
BY
ATTORNEYS

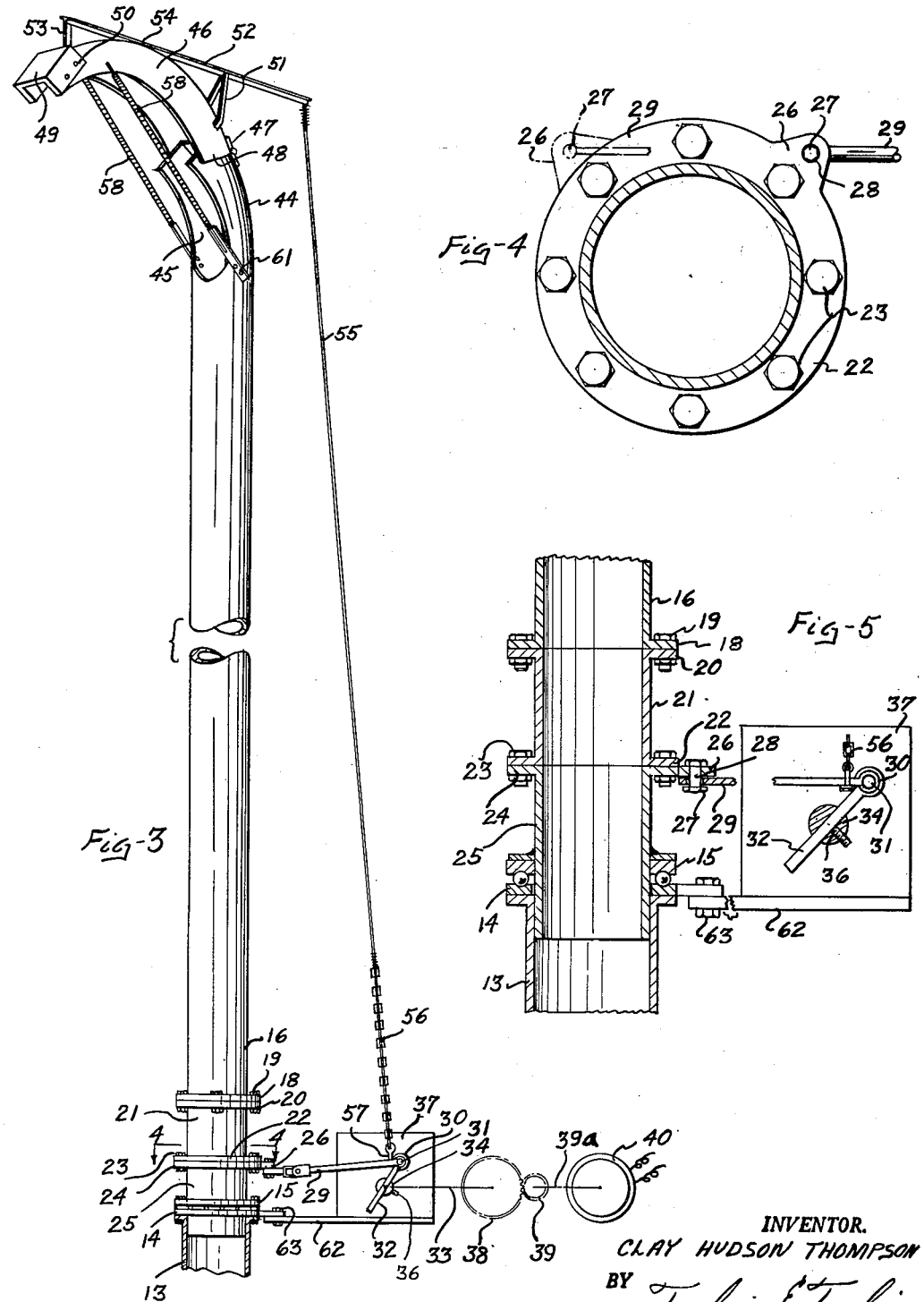

United States Patent Office 3,105,722
Patented Oct. 1, 1963

3,105,722
SILO DISTRIBUTOR
Clay Hudson Thompson, Rte. 5, Springfield, Ohio
Filed Feb. 27, 1961, Ser. No. 92,079
11 Claims. (Cl. 302—60)

The present invention relates to ensilage elevators for filling silos with cut feed material uniformly, thus avoiding or lessening the manual labor otherwise required to spread and pack the cut material by hand.

Various apparatus has been employed heretofore to fill silos with feed material, but such apparatus has either failed to distribute the material in an even manner over the distributing area, or is so highly complicated in structure as to be prohibitively expensive for the average farmer.

In certain types of silo filling apparatus, particularly when the ensilage is directed and operated by hand, one or more laborers must give his entire time to this operation, for otherwise the distribution of the ensilage within the silo would not be uniform nor deposited at such position as to encourage chemical action which facilitates its digestive properties.

The primary object of this invention is to provide an improved feed or ensilage distributor for silos and one which is entirely automatic.

Another object is to provide a feeding mechanism which distributes layer on layer of the ensilage within a silo, evenly over the entire cross-sectional area of the silo without the necessity of any hand labor and only the minimum of supervision throughout the entire feeding operation from the bottom to the top of the silo.

Still another object is to provide an improved feeding mechanism for distributing the successive layers of ensilage from the bottom to the top of the silo, in an even and concave form, which facilitates the digestive chemical action.

Still a further objection of the invention is to provide an improved feed or ensilage distributor for silos which utilizes an exterior form of feed conduit in which the upper or feed end of the conduit is moved from side to side, and in addition, is given a movement in the vertical direction in order to thoroughly distribute the feed material over the entire distributing area of the silo. This insures the lack of "dead" spaces.

A further object is to provide a distributing mechanism for feed silos having an exterior feed conduit extending to the top of the silo and in which the distributing end of the conduit is given a side to side and a simultaneous vertical movement in order to direct the feed over the entire area of the silo. The vertical movement of the distributing end of the conduit becomes a function of the side to side movement so that the directing end of the conduit describes a circular movement which follows automatically the inside perimeter of the silo.

Still another object is to provide a feed distributing mechanism which utilizes the exterior form of feed conduit and has a terminating nozzle directed toward the distributing area of the silo, and in which the nozzle is formed of two portions, one of which is integral with the conduit and the other is movable with respect thereto, the movable portion being actuated by means of a cable of fixed length which is given a pulling effect as the conduit is swung from side to side to give the movable nozzle portion a vertical oscillatory motion.

The above objects are attained by providing a vertical conduit which terminates in a nozzle or chute over the distributing area within the silo and causing the conduit and the nozzle to move in a lateral direction formed of two paths normal to one another and thus constitute a circular path consonant with the curved boundary of the silo. This circular movement of the distributing end of the conduit is attained as a composite of two movement normal to one another, and in which one of these movements is caused by the action of the other movement, so that the distributing effect of the nozzle in moving over a circular path is automatic in operation.

Other objects and features will be apparent as the specification is perused in connection with the accompanying drawings in which;

FIGURE 1 represents an elevational view, partly broken away and in section, of a typical silo which is provided with the improved feed distributing mechanism according to the principles of my invention;

FIGURE 2 constitutes two diagrammatic showings of the top of the silo in section, indicating the manner in which the nozzle is moved from side to side about a median line;

FIGURE 3 is an elevational view of the feed conduit and the terminating nozzle or chute portions, together with the mechanism, shown schematically, that operates the feed directing nozzle portions of the conduit;

FIGURE 4 is an enlarged view taken along line 4—4 in FIGURE 3 and looking in the direction of the arrows; and FIGURE 5 is a fragmentary sectional view, partly in elevation, showing the rotating or swivel mechanism attached to the conduit and the actuating member for rotating the conduit. The sectional view is taken at about the line 5—5 in FIGURE 1.

Referring to FIGURE 1, the reference character 1 designates a vertical silo made preferably of concrete blocks 2 strengthened by compression bands 3. The silo terminates in a dome-shaped portion 4 or cupola having a large opening 5 at the front through which the ensilage or feed material can be blown.

I have shown a conventional hopper 6 for the feed which may be supported at each side on tires 7 and legs 8. Connected to the hopper, in any well known manner and in communication therewith, there is a blower 9 contained within a housing 10 and having an exteriorly located shaft 11, to which power may be applied as indicated at 12 from a gasoline engine (not shown).

The housing 10 is provided with an outlet conduit 13. On top of this conduit there is positioned the lower race 14 of a ball bearing, the upper race of which is indicated at 15. The feed conduit for filling the silo may constitute a metal pipe 16 which is loosely secured to the external surface of the silo by means of equidistantly spaced straps 17. The lower end of the conduit or pipe 16 is provided with a flange 18 which is bolted as indicated at 19 to a flange 20 forming part of an extension pipe or conduit 21. The latter at its lower end is provided with a flange 22 which is bolted, as indicated at 23, to a flange 24 secured to the upper end of a pipe 25. The latter extends loosely into the neck or outlet conduit 13 of the blower and is provided at an intermediate position with the upper race 15 of the ball bearing member. Thus the feed conduit 16 is able to rotate with respect to the outlet conduit 13 of the blower and the weight of the conduit is taken at the thrust bearing members 14, 15.

The extension pipe 21 together with its flanges 20 and 22 is provided in order to allow a certain amount of adjustment in the vertical direction between the fixed upper surface of the blower and the lower surface of the feed conduit proper, as this extension can be cut to any length desired to fill the space in connecting the feed conduit with the blower.

In accordance with one of the features of my invention, I give the feed conduit 16 an oscillatory movement passing through approximately 90 degrees. The purpose of this movement will be explained hereinafter.

In order to effect the oscillatory motion of the conduit I attach to the bolted flanges 22, 24 a lug 26 (FIGURE 4) which may be formed integral with one of these flanges. This lug has an opening 27 therein for loosely receiving a swivel pin 28. The latter is carried on a crankshaft 29 which terminates at the other end in an eyelet 30 (FIGURE 3). A pin 31 engages the eyelet, the pin being located at the end of a bar or crank 32 which is carried at the center on a shaft 33. The latter may be provided with an enlarged or hub portion 34 having a diametrally extending slot 35 for slidably receiving the crank. A set-screw 36 (FIGURE 5) passes through the hub 34 to fix the position of the crank after the proper amount of throw of the latter has been determined. The shaft 33 passes into a gear box 37 and carries a large gear 38. A pinion 39 or other gearing drives the gear 38 which in turn is actuated through a shaft 39a by a motor 40.

In operation, as the motor rotates, the pinion 39 drives the large gear 38 at a greatly reduced speed, and the crank 32 is caused to rotate very slowly. As it moves, the crank alternately pushes and pulls the crankshaft to give the extension pipe 21 an oscillatory motion of approximately ninety degrees travel as indicated by the phantom position in dot-dash of the lug 26 in FIGURE 4. Thus, the entire vertical conduit 16 is moved from side to side in the horizontal direction carrying with it the upper or nozzle portion.

By the choice of the gearing within the box 37, of which only two gears 35, 36 are shown, but which actually could constitute any suitable form of gear train or gear ratio, the feed conduit 16 is moved at an extremely slow rate, just perceptible to the eye. There is, therefore, very little friction involved due to this slow movement, and particularly so, since the weight of the conduit 16 and the conduit extensions 21 and 25 is borne by a substantially frictionless ball bearing 14, 15.

The upper end of the feed conduit 16 has a slightly bent contour as indicated at 44 and the underside of the conduit around the bent portion is also left open as indicated at 45. This opening constitutes a part of the nozzle or conduit for directing the feed or ensilage material over the distributing area within the silo.

There is a movable conduit portion 46 hinged at 47 to the curved portion 44 of the feed conduit 16. This movable portion takes the general shape of the bent portion 44 (shown as being rectangular), but the sides of the movable conduit portion are somewhat wider than the sides of the bent portion 44 in order to embrace the latter, for reasons which will be explained presently.

There is also an overlap between the conduit or nozzle portions 44, 46, as indicated at 48. At the tip end of the movable conduit portion 46 there may be provided a rectangular extension 49, riveted as indicated at 50, and this extension could be made of harder metal than the remaining portions of the conduit on account of the abrasive effect of the feed as it moves at a high speed through the conduits.

The conduit portion 46, as well as the extension 49, are open over their lower sides in order that feed material can be readily emitted throughout the length of these two members, and to some extent through the opening 45. Secured to the movable conduit portion 46 there is a brace member 51 which serves as a rigid support for a bar 52, the other end of which is supported by an upright 53 from the terminating end of the conduit 46. This bar may rest, as indicated at 54, on the conduit to furnish still greater support.

A fixed flexible rod or cable 55 may be connected at one end to the bar 52 and at the other end through the extension chain 56 to a suitable position on the crankshaft 29 or to the eyelet 30.

There are two tension springs 58 fixedly located at one end to the movable conduit portion 46 and at the other end in any suitable manner to the feed conduit 16. These tension springs are so set that the movable conduit portion 46 and its nozzle-like end 49 are normally forced downwardly to their lowermost position. This position is such that as the feed material is blown up through the conduit the movable portion 46 will tend to distribute the feed material along a position nearer to the opening 5 in the silo. This will be explained in detail later.

In practice the bent conduit portion 44 and the movable conduit portion 46 are located such as to extend over and into the opening 5 in the cupola of the silo, as can be seen in FIGURE 1. As the conduit 16 is slowly oscillated from side to side in the manner heretofore explained, the bent conduit portion 44 and the movable conduit portion 46 will be given a wide swinging motion from right to left and vice versa across the distributing area within the silo.

The cable 55 will also be pulled upwardly and downwardly by the combined action of the rotating crank 32 and the springs 58 operating through the hinged portion 46 and the bar 54.

Consequently, assuming that feed material is passing from the hopper 6 through the blower 9 into the feed conduit 16, and assuming that the latter is slowly oscillating across the interior of the silo, the effect of the vertical movement of the conduit portion 46 will be to describe a continuous circular path in depositing the feed material, as indicated by the arrows 59 (FIGURE 2), this path constituting a composite of the vertical movement of the movable conduit portion 46, and the ninety degree horizontal movement of the conduit.

As seen in FIGURE 2 the path of distribution of the ensilage delivered by the movable conduit portions 46, 49 conforms fairly close to the circular boundary of the silo, so that there can be no dead spaces where the delivery of the material has missed. Moreover, the curvature of the portions 44, 46 of the feed conduit are such as to deposit the feed material adjacent the opening 5 without blowing the material over the top horizontal edge 60 of the opening.

It has further been found that more especially due to the curved paths toward which the bent portion 44 and the movable portion 46 of the conduits are directed, and as shown in FIGURE 2, the ensilage tends to lay in a concave condition, as indicated at 61 (FIGURE 1), which is the ideal position to facilitate drainage toward the center and thus encourage chemical action in the ensilage. The latter is distributed, layer upon layer, evenly over the entire surface of the silo interior, and there is no need for a workman to stand on the ensilage pack to distribute the same by rake or shovel.

It is obvious that when it is desired to change the length of the feed conduit in order to accommodate lower or higher levels of the position at which the conduit portions 44, 46 are located, it is necessary merely to change the length of the conduit extension 21. This can be done readily by having a number of these pipe lengths available so as to accommodate any height of silo or any position of the feed distributing opening in the silo. As the height of this opening is changed, the length of the cable 55 is correspondingly either lengthened or shortened at the chain 56, so as to provide the elevating action of the movable conduit 46 as the feed conduit is oscillated to either side of the imaginary median line. The adjustment made at the hub 34 will determine the "throw" of the crank and thus affect the diameter of the path taken by the end of the chute 46, 49 to accommodate different sizes of silo.

It will be noted that the gearing 35, 36, also the crank 32 and the crank pin 31, are either contained in or supported by the gear box 37. These elements, therefore, constitute a self-contained unit, and as shown, are supported on a platform 62 which can be bolted as indicated at 63 to an extension of the lower race 14 of the ball bearing.

From the foregoing it is evident that I have disclosed a feed conduit system or apparatus in which the distributing end is caused to direct the feed over a wide area within the silo, giving the places of deposit a generally circular path conforming to the shape of the silo, and thus leaving no dead spots, but causing the successive layers to form evenly on one another in a generally concave contour. This distributing effect is obtained in its entirety by the oscillating movement of the feed conduit operating through a cable connected to the same mechanism as provides the oscillatory movement of the conduit.

It will be understood that this invention is susceptible to modification in order to adapt it to different usages and conditions and accordingly, it is desired to comprehend such modifications within this invention as may fall within the scope of the appended claims.

What is claimed is:

1. In a silo distributing apparatus, the combination of a vertical feed conduit and means including a directing chute swivelly mounted on the end of said conduit for distributing the ensilage about the interior of the silo, means for oscillating the conduit back and forth to carry the directing chute across the interior of the silo, and means connected to said oscillating means for simultaneously oscillating the directing chute in the vertical direction, said means for oscillating the conduit being located at ground level.

2. In a silo distributing apparatus, the combination of a vertical feed conduit swivelly mounted on the wall of a silo, said conduit terminating in a feed directing chute which comprises two portions forming extensions of one another, one of said portions being integral with said conduit and having a bent configuration, the second portion being mounted for movement about the integral portion, means located at ground level for oscillating said conduit, and means connected to said last mentioned means for simultaneously oscillating said second chute portion about the integral portion in order to direct the feed successively toward different parts of the feed level in the silo.

3. In a silo distributing apparatus, the combination of a feed conduit adapted to extend upwardly along the wall of the silo, said conduit being mounted for an oscillatory movement in a horizontal plane about the silo, a silage conveying means at the lower end of said conduit, a nozzle at the upper end of the conduit at the position of the feed distributing action, said nozzle being mounted on said conduit to permit an up and down movement in order to distribute the feed more evenly in the silo, and means including a single source of power for simultaneously oscillating the conduit and for moving the nozzle up and down whereby the combined horizontal and vertical movements cause the nozzle to describe a circular path in order to direct the feed from the silage conveyor means into a contour corresponding to the interior shape of the silo, said means being located at the lower end of the conduit, adjacent to said silage conveyor means.

4. In a silo distributing apparatus, the combination of a feed conduit adapted to extend upwardly along the wall of the silo, said conduit being mounted for an oscillatory movement in a horizontal position about the silo, a silage conveying means at the lower end of said conduit, a nozzle at the upper end of the conduit at the position of the feed distributing action, said nozzle being mounted on said conduit to permit an up and down movement in order to distribute the feed more evenly in the silo, and means including a crank driven by a source of power for simultaneously oscillating the conduit and for moving the nozzle up and down whereby the combined horizontal and vertical movements cause the nozzle to describe a circular path in order to direct the feed from said silage conveying means in a contour corresponding to the interior shape of the silo, said means being located, at least in part, at the lower end of the conduit, adjacent to said silage conveying means, said source of power including a motor and transmission system mechanically connected to the conduit, also a cable extending between said nozzle and said crank.

5. In a silo distributing apparatus, the combination of a feed conduit adapted to extend up the external wall of a silo, the distributing end of the conduit terminating in a curved portion having feed exit opening at the under side thereof, a nozzle member constituting an extension of said curved portion and having a feed exit opening at the same side as the opening in the curved portion, said nozzle member being hinged to said curved portion to permit said member to move up and down with respect to said portion, means located at ground level for oscillating said conduit in the horizontal direction whereby the curved portion and extension member are moved sideways, and means for simultaneously moving the nozzle member in the vertical direction whereby said member swings in a curved path representing the composite of the horizontal and vertical movements.

6. In a silo distributing apparatus, the combination of a feed conduit adapted to extend up the external wall of a silo, the distributing end of the conduit terminating in a curved portion having feed exit opening at the under side thereof, a nozzle member constituting an extension of said curved portion and having a feed exit opening at the said side as the opening in the curved portion, said nozzle member being hinged to said curved portion to permit said member to move up and down with respect to said portion, a power driven crank operably connected to the lower end of the feed conduit for oscillating said conduit in the horizontal direction whereby the curved portion and extension member are moved sideways, and means including said crank for simultaneously moving the nozzle member in the vertical direction whereby said member swings in a curved path representing the composite of the horizontal and vertical movements, said last mentioned means comprising a cable connected at one end of the nozzle member and at the other end to said crank.

7. In a silo distributing apparatus, the combination of a feed conduit adapted to extend up the external wall of a silo and terminating at the top in a feed distributor directed into the silo, the distributing end of said conduit terminating in a nozzle which is adapted to swivel in a vertical direction, and means for simultaneously oscillating the conduit in the horizontal direction and for actuating the nozzle in an up and down movement during the filling of the silo, said means comprising a power driven crank operably connected to the lower end of the feed conduit for providing the conduit oscillatory action, and a cable attached at one end to the nozzle and anchored on said crank at the other end for providing the up and down motion of the nozzle as the conduit is oscillated.

8. In apparatus for filling a silo with feed material, said silo having a swivable feed conduit which terminates in a nozzle at the filling position, a source of power, and a self-contained accessory unit including a train of gears connected to a crank actuator for conveying oscillatory power to the conduit, said crank being movable in the vertical direction, said unit, in addition, including a cable attached between the nozzle and said crank in order to cause the nozzle to move up and down as the conduit is oscillated.

9. In combination a silo having a feed conduit extending vertically along the silo, a feed blower for delivering feed into the lower end of said conduit, the upper end of said conduit terminating in a swivelly mounted extension so that the latter is adapted to move in the vertical direction with respect to the remaining portion of the conduit, a horizontal bearing supported on the outlet pipe of said blower, and means for simultaneously oscillating the entire feed conduit including said extension in the horizontal direction about said bearing and for moving said conduit extension in an up-and-down direction whereby the extension portion of said conduit describes a circular continuous path of movement corresponding to the interior shape of the silo.

10. In combination, a silo having a feed conduit extending vertically along the silo, a feed blower for delivering feed into the lower end of said conduit, the upper end of said conduit terminating in a swivelly mounted extension so that the latter is adapted to move in the vertical direction with respect to the remaining portion of the conduit, a horizontal bearing supported on the outlet pipe of said blower, means for supporting a power-driven crank at the approximate level of said bearing, and means for employing the driving force of said crank for oscillating the said conduit about said bearing and for moving said conduit extension in an up-and-down direction whereby said conduit extension describes a circular continuous path of movement corresponding to the interior shape of the silo.

11. In combination, a silo having a feed conduit extending vertically along the silo, a feed blower for delivering feed into the lower end of said conduit, the upper end of said conduit terminating in a swivelly mounted extension so that the latter is adapted to move in the vertical direction with respect to the remaining portion of the conduit, a horizontal bearing supported on the outlet pipe of said blower, means for supporting a power-driven crank at the approximate level of said bearing, and means for employing the driving force of said crank for oscillating the said conduit about said bearing and for moving said conduit extension in an up-and-down direction whereby said conduit extension describes a circular continuous path of movement corresponding to the interior shape of the silo, the said means for moving the conduit extension in an up-and-down direction including a cable of fixed length connected between the said extension and the crank.

References Cited in the file of this patent

UNITED STATES PATENTS

| | | |
|---|---|---|
| 782,444 | Gibbons | Feb. 14, 1905 |
| 2,650,136 | Raleigh | Aug. 25, 1953 |
| 2,752,204 | Broughton | June 26, 1956 |